US008126467B2

(12) United States Patent  
Choi et al.

(10) Patent No.: US 8,126,467 B2  
(45) Date of Patent: Feb. 28, 2012

(54) METHOD FOR CONTROLLING HANDOFF IN OPTICAL DISTRIBUTED NETWORK SYSTEM USING MULTI INPUT MULTI OUTPUT

(75) Inventors: Do-In Choi, Yongin-si (KR); Seong-Taek Hwang, Pyeongtaek-si (KR); Yun-Je Oh, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 598 days.

(21) Appl. No.: 11/623,791

(22) Filed: Jan. 17, 2007

(65) Prior Publication Data

US 2007/0189261 A1 Aug. 16, 2007

(30) Foreign Application Priority Data

Feb. 14, 2006 (KR) .................. 10-2006-0014368

(51) Int. Cl.  
*H04W 36/00* (2009.01)

(52) U.S. Cl. .............. 455/444; 455/161.3; 455/524; 455/525; 455/436; 455/443; 370/331; 370/332; 370/334; 370/206; 375/267; 375/260

(58) Field of Classification Search .............. 370/310, 370/328, 329, 330, 331, 332, 333, 334, 206; 455/403, 422.1, 436, 437, 438, 439, 440, 455/442, 443, 550.1, 553.1, 561, 562.1, 161.3, 455/115.13, 525, 524, 444; 375/267, 260

See application file for complete search history.

(56) References Cited

U.S. PATENT DOCUMENTS

| | | | |
|---|---|---|---|
| 7,042,858 B1 * | 5/2006 | Ma et al. ............. | 370/331 |
| 2003/0129982 A1 * | 7/2003 | Perini ............. | 455/442 |
| 2004/0219950 A1 * | 11/2004 | Pallonen et al. ......... | 455/562.1 |
| 2007/0140185 A1 * | 6/2007 | Garg et al. ............. | 370/338 |

\* cited by examiner

*Primary Examiner* — Kamran Afshar  
*Assistant Examiner* — Neda Behrooz  
(74) *Attorney, Agent, or Firm* — Cha & Reiter, LLC

(57) ABSTRACT

A method for controlling a handoff in an optical distributed network system using MIMO (multi input multi output) is disclosed. The method includes steps of classifying a channel into a first channel and a second channel, and setting an active cell, receiving and measuring a signal strength of a predetermined cell, and determining on/off of the predetermined cell, when the predetermined cell turns on, releasing the first channel of the active cell, switching a path to a first channel of the predetermined cell, and keeping the second channel of the active cell, receiving and measuring a signal strength of the active cell, and when the measured signal strength is a preset critical value or less, turning off the active cell and when the active cell turns off, releasing the second channel of the active cell, and switching the path to a second channel of the predetermined cell.

14 Claims, 12 Drawing Sheets

METHOD FOR CONTROLLING HANDOFF IN OPTICAL DISTRIBUTED NETWORK SYSTEM USING MULTI INPUT MULTI OUTPUT

CLAIM OF PRIORITY

This application claims the benefit of the earlier filing date, under 35 U.S.C. §119, to that patent application entitled "Method For Controlling Handoff In Optical Distributed Network System Using Multi Input Multi Output," filed in the Korean Intellectual Property Office on Feb. 14, 2006 and assigned Serial No. 2006-14368, the contents of which are incorporated herein by reference.

BACKGROUND OF THE INVENTION

1. Field of the Invention

The present invention relates to a method for controlling a handoff in an optical distributed network system, and in particular, to a method for controlling a handoff in an optical distributed network system using multi input multi output (MIMO).

2. Description of the Related Art

Since the late 1970s the U.S. has developed a cellular mobile communication system. Korea is now beginning to provide a voice communication service by an advanced mobile phone service (AMPS) method that is based on an analogous $1^{st}$ generation (1G) mobile communication system. In the middle 1990s, a code division multiple access (CDMA) system was commonly used as a $2^{nd}$ generation (2G) mobile communication system. The CDMA system provides voice and low-rate data services.

International mobile telecommunication-2000 (IMT-2000), is under development is a $3^{rd}$ generation (3G) mobile communication system beginning from the late 1990s with the objection of improved radio multimedia service, global roaming, and high-rate data service. The $3^{rd}$ generation mobile communication system has been developed to transmit data at a higher rate to accommodate the rapid increases in the amount of service data of the mobile communication system.

As the $3^{rd}$ generation mobile communication system begins to be commonly used, attention is being transferred to a beyond $3^{rd}$ generation (B3G) or $4^{th}$ generation (4G) mobile communication system. The B3G or $4^{th}$ mobile communication systems are being standardized with an aim of creating an effective association and an integral service of a wire communication network and a wireless communication network.

Accordingly, the wireless communication network is requires a technology for transmitting a large capacity data that comes close to the capacity of the wire communication network. For this, a mobile communication system using multi input multi output (MIMO) is presently under investigation.

In general, the MIMO employs a multi transmission antenna and a multi reception antenna instead of one transmission antenna and one reception antenna, thereby improving an efficiency of data transmission. Basically, the MIMO greatly increases the data transmission efficiency by transmitting and receiving several signals using several antennas at the same time. Thus, it has an advantage of transmitting much more data than in the existing mobile communication system without increasing the required bandwidth.

There is a great possibility in which a carrier frequency for transmitting data is set to a band higher than an existing frequency of 5 GHz. The prospect is that a cell radius would be gradually reduced to keep a high data rate and the same capacity as an existing capacity according to a free space propagation model. Thus, a distributed network system based on a picocell of about one hundred meter seems to be required.

A conventional method for executing the distributed network system on a per-picocell basis uses an optical relay or multi hop technology.

The multi hop technology, a technology recently proposed for constructing a picocell having many cellular systems, can widen a service boundary of a cell without installation of a separate wire line. However, the multi hop technology has a drawback in that frequency interference occurs and thus, is limited in constructing and managing the cell.

However, the method using the optical relay has an advantage that it does not cause such a drawback and thus, is free from propagation interference in managing the picocell. Thus, in actuality, the distributed network system is using the optical relay.

FIG. 1 illustrates a construction of the distributed network system using the optical relay.

Referring to FIG. 1, the distributed network system includes a base station transceiver subsystem (BTS) 101, a base station controller (BSC) 102, a base station (BS) 103, and a radio access unit (RAU) 104.

In a detailed description of the distributed network system using the optical relay, the base station transceiver subsystem 101 performs a function of radio access with a mobile terminal (MT) (not shown), and a function of wire and radio access between the mobile terminal and the base station controller 102.

The base station controller 102 is positioned between the base station 103 and a mobile services switching center (not shown), and manages and controls the base station transceiver subsystem 101 and the base station 103.

The base station 103 connects with the base station transceiver subsystem 101. The base station 103 receives a signal from the mobile terminal provided within its managing picocell, over a wireless channel, and transmits the received signal to the mobile services switching center. Similarly, the base station 103 transmits a signal coming from the mobile services switching center, to the mobile terminal over the wireless channel.

In general, in the distributed network system using the optical relay, a large area is divided into a small area that is called picocell, for the effective use of the wireless channel. The distributed network system performs a wireless communication with the mobile terminal through the base station 103 provided in each picocell. The picocell defines a wireless coverage area established by the base station 103 positioned in each picocell. Similarly, each of the other picocells defines a related wireless coverage area established by a corresponding base station 103 positioned among the associated picocell.

The radio access units 104 connect with the base station transceiver subsystem 101, and define the picocells around the corresponding base station 103. The base station 103 and the mobile terminal perform the wireless communication with each other using the radio access units 104. Moving in position in course of the wireless communication within the picocells, the mobile terminal measures a signal strength of each picocell, and clamps to the most relevant picocell.

The most important issue of the distributed network system constructed by the many picocells is to process a handoff that is frequently implemented when the mobile terminal moves between the picocells so as to keep a state of uninterrupted communication.

The handoff refers to changing a communication path to a cell to which movement is implemented, to keep a communication when the mobile terminal moves to another base station (or sector) out of an in-service base station (or sector) in the general mobile communication system. Unlike an analogous method supporting a hard handoff where an existing communication line is first cut and then is connected to a new base station, a CDMA method supports even a soft handoff where communication paths with two base stations (or sectors) are concurrently maintained.

FIG. 2 illustrates an example of a conventional operation of processing the soft handoff in the mobile communication system.

FIG. 2 conceptually exemplifies variations of intensities of signals received from a base station1 202 and a neighbor base station2 203 when a mobile terminal 201 moves from "a" point to "b" point within an overland (OL) area where a service boundary cell 1 of the base station1 202 and a service boundary cell 2 of the neighbor base station2 203 are overlapped.

The operation of processing the soft handoff in the mobile communication system will be described with reference to FIG. 2. In this exemplary processing example, it is assumed that the mobile terminal 201 receiving a service in the service boundary cell 1 of the base station1 202 moves to the service boundary cell 2 of the neighbor base station2 203.

In a little more detailed description of the operation, the soft handoff is generated under the control of the base station controller 102 when the mobile terminal 201 is positioned in the area where the service boundary cell 1 of the base station1 202 and the service boundary cell 2 of the base station2 202 are overlapped.

In other words, the mobile terminal 201 receiving the service from the base station1 202 detects a signal strength at or exceeding a preset value (T_ADD), from the base station2 203. The detected signal strength indicates a handoff is necessary in the course of movement toward base station2 203. The mobile terminal 201 transmits the detected signal strength from base station1 203 to the corresponding base station controller 102.

In response to this, the base station controller 102 checks whether or not the base station2 203 is in an idle state. Checking in the idle state, the base station controller 102 allocates a channel between the base station2 203 and the mobile terminal 201. If the channel allocation to the base station2 203 is implemented, the base station1 202 and the base station2 203 provide services to the mobile terminal 201 over the respective allocated channels.

As the mobile terminal 201 continues to move toward base station2 203, at the signal strength received from the base station1 202 reduces below a preset value (T_DROP). In this case, the mobile terminal 201 drops the in-service base station1 202, and receives the service only from the base station2 203. The mobile terminal 201 has a time margin of a predetermined time in which base station1 202 is dropped. In other words, only when the time margin lapses after the signal strength is detected below the preset value (T_DROP) does the mobile terminal 201 drop the base station1 202. This prevents the handoff from being implemented when the signal intensity spontaneously falls.

Pilot channel information for allowing the mobile terminal 201 to measure the signal strengths received from the base stations 202 and 203 includes an active set, a candidate set, a neighbor set, and a remaining set. The active set denotes a pilot of the base station (or the sector), such as a forward traffic channel allocated to the mobile terminal 201. The candidate set denotes a pilot that is not currently the active set but is received by a sufficient intensity. The neighbor set denotes a pilot that does not currently exist at the active set or the candidate set but can become the candidate set. The remaining set denotes all pilots possible other than the above set in a current system.

As shown in FIG. 2, the soft handoff is implemented in the handoff region by monitoring the signal strength at the mobile terminal 201 of the signal strengths from the base stations 202 and 203 using several pieces of pilot channel information, and, in a predetermined critical region, generating a message that the handoff is active, and concurrently transceiving the same data from both of the base stations 202 and 203.

However, the conventional soft handoff in the mobile communication system has a drawback in that it is difficult to overcome an essential latency time caused by protocol processing between the base station controller 102 and the mobile terminal 201, in processing the handoff to be frequently implemented in a plurality of the picocells in the distributed network system for the B3C or 4$^{th}$ mobile communication system.

SUMMARY OF THE INVENTION

The present invention provides a method for controlling a handoff in an optical distributed network system using multi-input multi-output frequently implemented between picocells for a B3G or 4$^{th}$ generation mobile communication system, and thus minimizing a latency time and making uniform data transmission possible.

In one embodiment, there is provided a method for controlling a handoff in an optical distributed network system using MIMO (multi-input multi-output). The method includes steps of classifying a channel for transceiving data with a mobile terminal, into a first channel and a second channel, and setting an active cell, receiving a signal strength of a predetermined cell from the mobile terminal, measuring the received signal strength of the predetermined cell, and determining on/off status of the predetermined cell, when the predetermined cell is determined to be on, releasing the first channel of the active cell, switching a path to a first channel of the predetermined cell, and keeping the second channel of the active cell, receiving a signal strength signal strength of the active cell from the mobile terminal, measuring the received signal strength of the active cell, and when the measured signal strength of the active cell is at least or below a preset critical value, turning off the active cell, and when the active cell turns off, releasing the second channel of the active cell, and switching the path to a second channel of the predetermined cell.

BRIEF DESCRIPTION OF THE DRAWINGS

The above features and advantages of the present invention will become more apparent from the following detailed description when taken in conjunction with the accompanying drawings in which.

DETAILED DESCRIPTION

Figure 1:
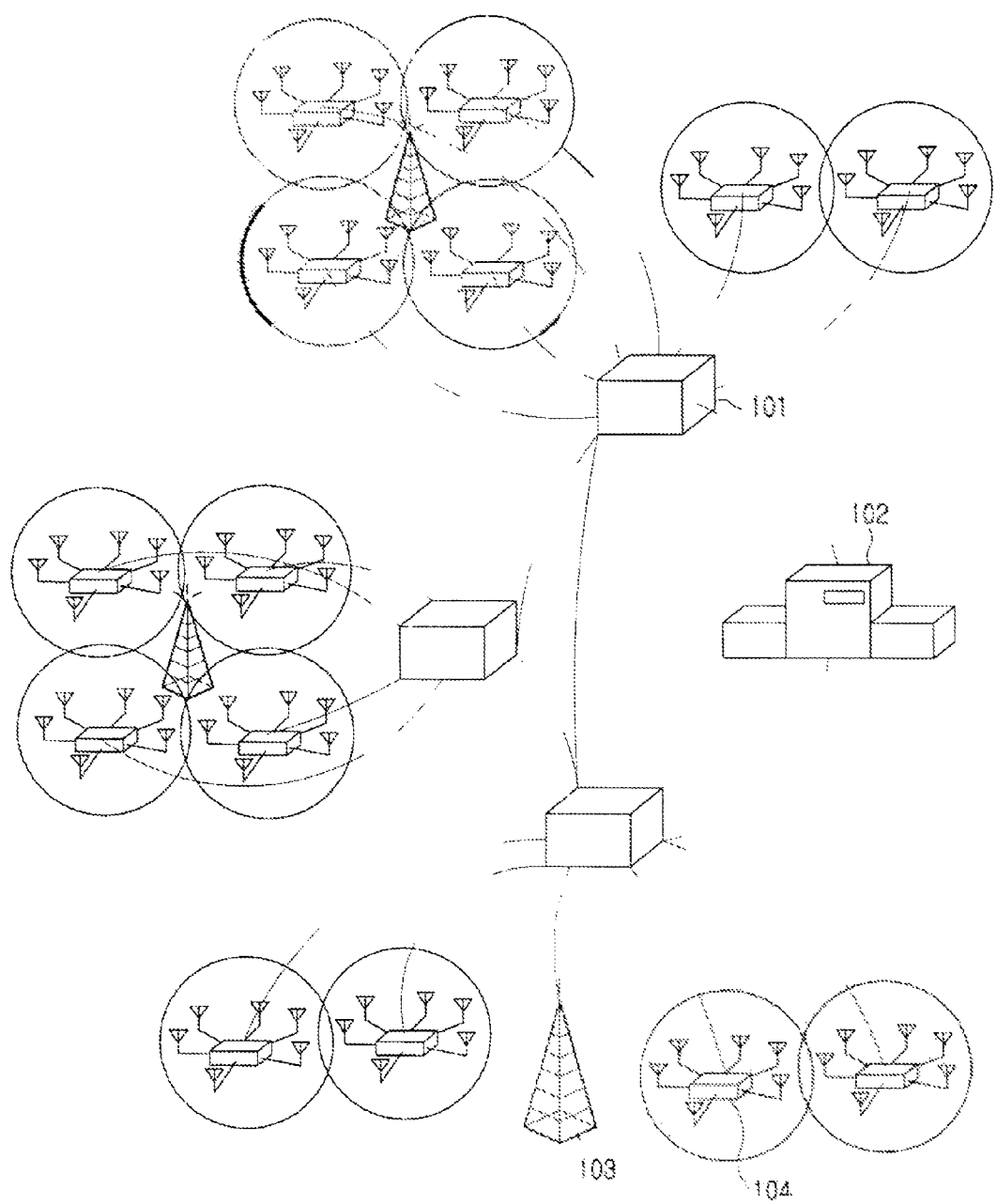
FIG. 1 illustrates a construction of a conventional distributed network system using an optical relay.
Figure 2:
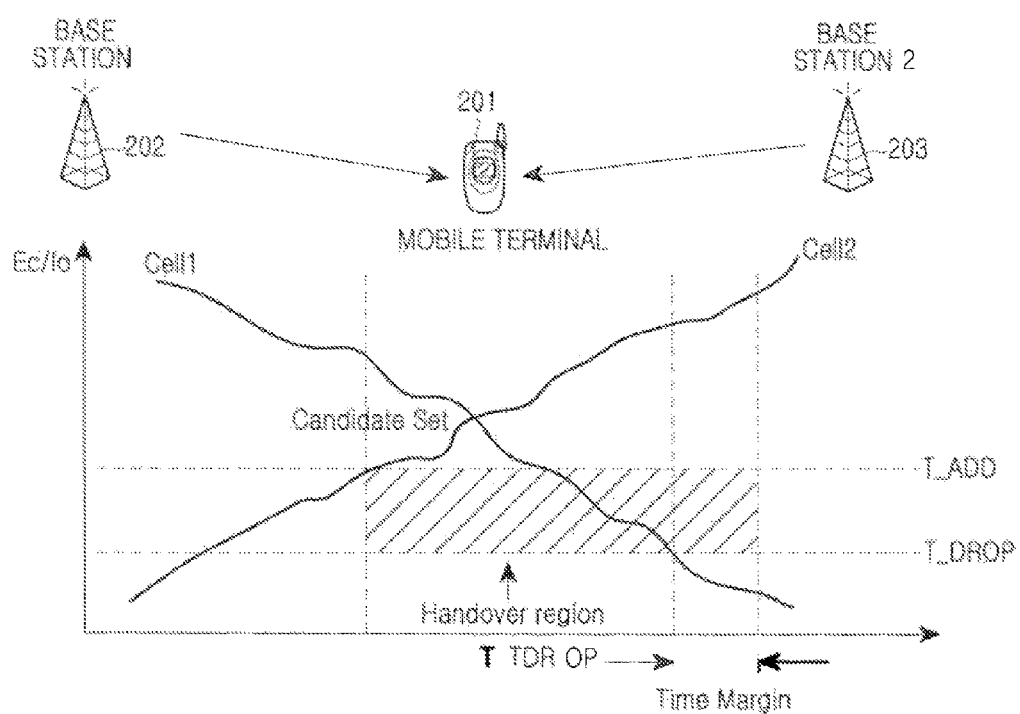
FIG. 2 illustrates an example of a conventional operation of processing a soft handoff in a mobile communication system.

A preferred embodiment of the present invention will now be described in detail with reference to the included drawings. In the drawings, the same or similar elements are denoted by the same reference numerals even though they are depicted in different drawings. In the following description, a detailed description of known functions and configurations incorporated herein has been omitted for conciseness.

Figure 3:
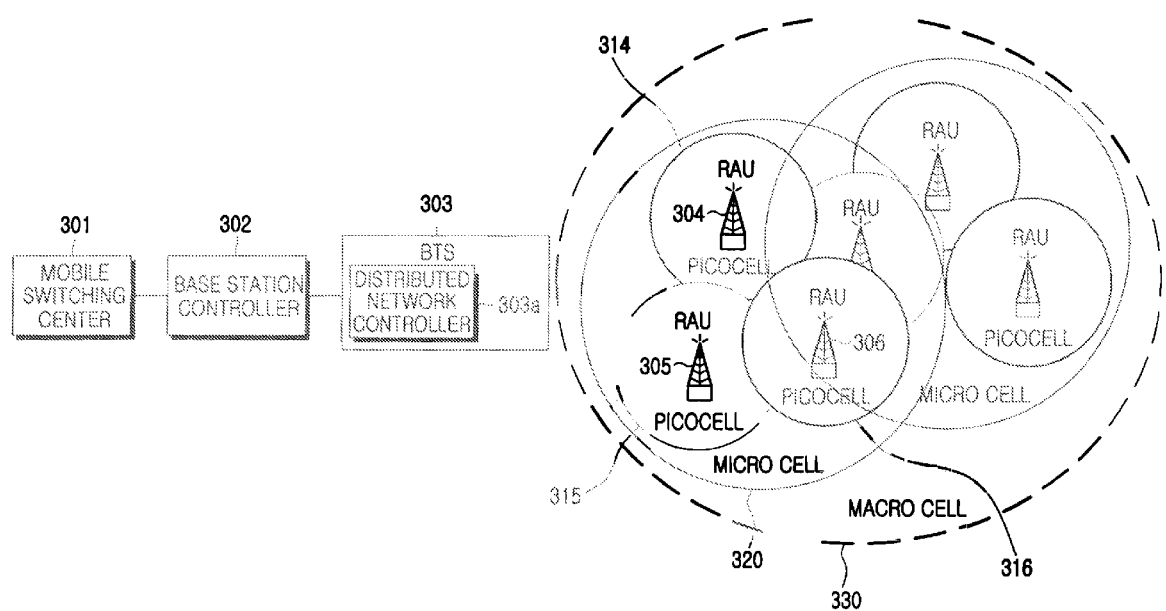
FIG. 3 illustrates a construction of an optical distributed network system using MIMO according to an exemplary embodiment of the present invention.

FIG. 3 illustrates a construction of an optical distributed network system using multi-input multi-output (MIMO) system according to an exemplary embodiment of the present invention.

Referring to FIG. 3, the inventive optical distributed network system using the MIMO includes a mobile switching center (MSC) 301; a base station controller (BSC) 302; a base station transceiver subsystem 303 including a distributed network controller 303A; and radio access units 304, . . . , 306.

The optical distributed network system using the MIMO will be described in more detail below. The mobile switching center 301, a switching system widely used in a mobile communication system, performs the function of call connection depending on whether the call is incoming and outgoing. In a system aiming at a data communication in a $3^{rd}$ generation partnership project 2 (3GPP2) camp, the mobile switching system is developing into a type in which it performs just only a switching function among various functions. This is called "MSCe". The mobile switching center 301 refers to a device for performing the switching function for the call connection in an earlier $2^{nd}$ or $3^{rd}$ generation mobile communication system. Including the switching function, the mobile switching center 301 should be interpreted as the same meaning even though it is commonly used by a different name in a system developed in the future.

The base station controller 302 controls a plurality of base stations 103 refers to a device for a connection of a data call including a voice signal between the mobile switching center 301 and the base station transceiver subsystem 303. Thus, the base station controller 302 basically provides a communication path between the mobile switching center 301 and the base station transceiver subsystem 303, and controls radio resource allocation and scheduling of the base station transceiver subsystem 303. In general, these control functions are known to those having an ordinary knowledge in a wireless communication system art and thus, will not be described in more detail, herein.

The base station transceiver subsystem 303 includes the distributed network controller 303A according to the present invention, and includes a plurality of radio transceivers (not shown in FIG. 3). Each of the radio transceivers, which are units for performing a voice or data communication with one wireless terminal, performs transmission/reception of data in a predetermined radio band set in the wireless communication system. The radio transceivers can include modems for modulating/demodulating and encoding/decoding transmission/reception data. In the present invention, one base station transceiver subsystem 303 connects at its lower level with the plurality of radio access units (RAU) 304 . . . 306.

The operation of the connections of the plurality of radio access units 304 . . . 306 will be described. The inventive wireless communication system uses a high frequency band. Using the high frequency band, the wireless communication system has a feature of strong straightness (direct-line) and weak diffraction when transmitting an electric wave. As shown in FIG. 3, the radio access units 304 . . . 306 have predetermined surrounding service boundaries. These service boundaries are called "picocells" in the present invention. One micro cell 320 consists of the illustrated picocells 314 . . . 316.

One macro cell 330 constitutes at least two micro cells 320. Thus, the base station transceiver subsystem 303 can manage one macro cell 330 or manage at least one micro cell 320. That the base station transceiver subsystem 303 can manage cells of sizes different from each other, such as the micro cell 320 or the macro cell 330. This management determined on the number of mobile terminals located in a corresponding service boundary.

Similarly, the micro cell 320 constitutes several picocells 314 . . . 316. The number of the picocells 314 . . . 316 is determined based on the existing conditions, such as expected traffic circumstances and the number of users at a place where a system is to be installed. This is a fact obvious to those having an ordinary knowledge in the art. The MIMO, which is a key technology of a B3G or $4^{th}$ generation mobile communication system, is embodied on a per-picocell basis. The mobile terminal (not shown) can communicate with the radio access unit of a service boundary where it is positioned, using the MIMO.

Figure 4:
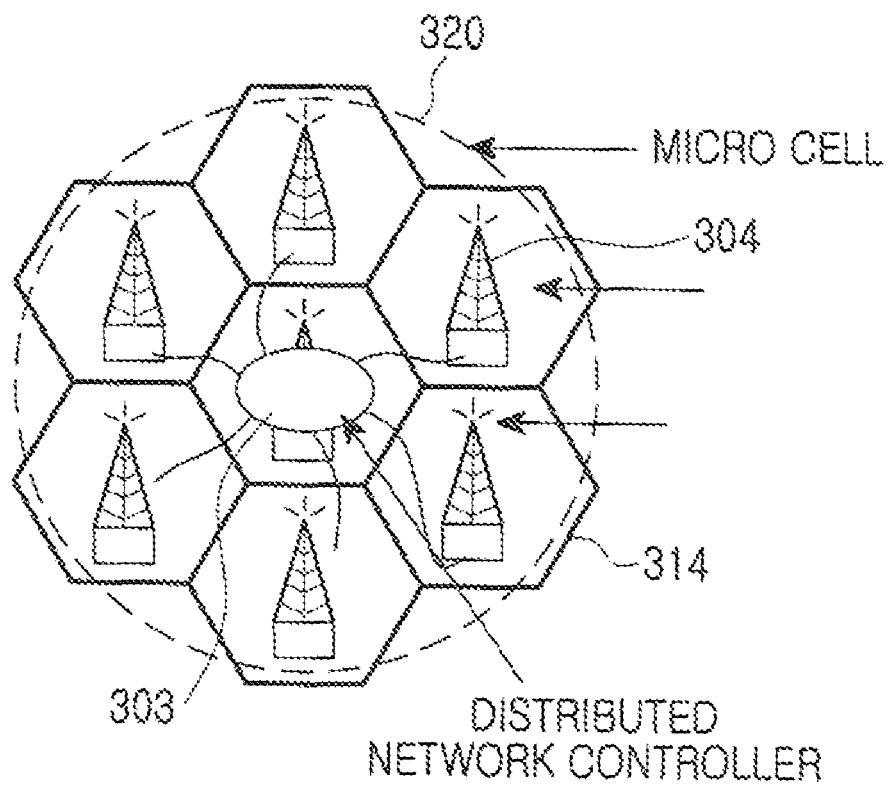
FIG. 4 illustrates an internal construction of a micro cell of FIG. 3.

FIG. 4 illustrates an internal construction of the micro cell 320 of FIG. 3. The radio access unit will be typically denoted by a reference numeral 304 below.

Referring to FIG. 4, the base station transceiver subsystem 303 is positioned in the middle of the micro cell 320 to minimize the distance from each radio access unit 304. However, it would be recognized that the base station may be positioned within any picocell. The present invention provides the distributed network controller 305 within the base station transceiver subsystem 303 to manage the plurality of radio access units 304.

As shown in FIG. 4, the base station transceiver subsystem 303 can also constitute one picocell.

Accordingly, the base station transceiver subsystem 303 has to have the same construction as the radio access unit 304.

Connection between the base station transceiver subsystem 303 and the radio access units 304 constituting the respective picocells 314 . . . 316 uses an optical communication method. The present invention proposes that a communication between the base station transceiver subsystem 303 and the radio access unit 304 is based on a baseband optical communication.

In addition, a signal strength of the mobile terminal in the picocells 314 ... 316 is normalized in the radio access unit 304, and is concurrently transmitted as an analog signal to the distributed network controller 305 over a separate optical channel. This is to remove a decoding and frame decapsulation time, thereby allowing for a faster handoff. A construction for using the optical communication method will be in detail described with reference to FIGS. 5 and 6.

A communication process implemented in the inventive optical distributed network system described with reference to FIGS. 3 and 4 will now be described below.

The respective radio access units 304, which are installed within the picocells 314 ... 316 provided within the micro cell 320, perform a communication between an uplink and a downlink within the unitary micro cell 320, using the same frequency and the same channel, as follows.

Typically, downlink data is broadcast transmitted while data transmitted in the uplink is uni-casted. Accordingly, the downlink data transmitted employs a method in which all terminals can receive the data and isolate only their own data. On the other hand, the uplink transmitted data employs a uni-casting method so that a specific mobile terminal can designate a transmission signal. This is to prevent a consumption of a frequency channel more than is needed. Designating the uplink data on a per-user basis can secure a user channel by a multiplexing method such as orthogonal frequency division multiplexing (OFDM).

When the mobile terminal moves within the unitary micro cell 320, a change between the picocells 314 ... 316 can be generated. The mobile terminal can implement the handoff between the picocells 314 ... 316 in such a soft handoff manner that a data swap between sectors or the picocells 314, ..., 316 is performed by a rake receiver. The soft handoff refers to a soft handoff implemented between the sectors included in a specific picocell. In other words, it is distinguished from a soft handoff implemented between the picocells 314 ... 316. The handoff between the picocells 314 ... 316 uses a normalized value of a signal strength of a signal received from the base station 103, in the mobile terminal. The distributed network controller 305 controls the handoff between the picocells 314 ... 316, using the normalized value.

Figure 5:
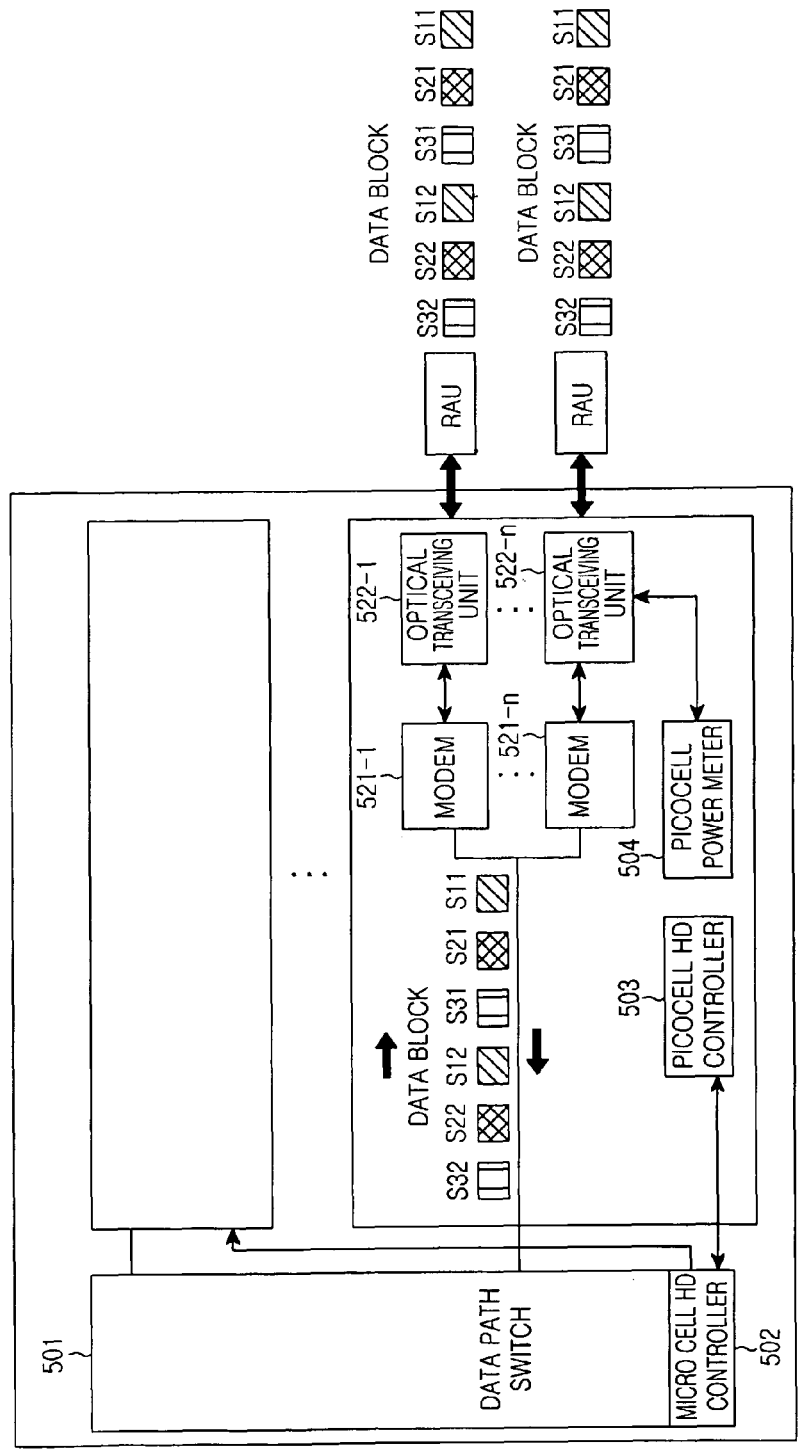
FIG. 5 illustrates a construction of a distributed network controller according to an exemplary embodiment of the present invention.

FIG. 5 illustrates a construction of the distributed network controller according to an exemplary embodiment of the present invention.

Referring to FIG. 5, the inventive distributed network controller 305 includes a data path switch 501, a micro cell HD controller 502, a picocell HD controller 503, a picocell power meter 504, modems 521-1, ..., 521-n, and optical transceiving units 522-1, ..., 522-n.

The construction of the distributed network controller 305 will be described in a little more detail. The data path switch 501 switches to the picocell depending on whether the distributed network controller 305 transmits a signal received from an upper level, to any picocell. Here, the upper level refers to the base station controller 302 or its corresponding node for the call connection, and the picocell includes a cell where the base station transceiver subsystem 303 is positioned.

The micro cell HD controller 502 detects whether the distributed network controller 305 transmits the reception signal from the upper level to any micro cell 320, using a header, and controls the data path switch 501 to switch to the detected micro cell 320.

The picocell HD controller 503 detects whether the distributed network controller 305 transmits the signal to any picocell of the micro cell 320 detected by the micro cell HD controller 502, using a header, and controls the data path switch 501 to switch to the detected picocell.

The picocell power meter 504 receives the signal strengths, which are received from the radio access unit 304 of the picocell by the respective mobile terminals provided within the service boundary of the picocell 314 and uses the received signal strengths for power control and future scheduling.

Depending on the method adopted by the B3G or 4G mobile communication system, the modem 521-1, ..., 521-n modulates and encodes data to transmit, and demodulates and decodes a received signal. A modulation method can employ binary PSK (BPSK), quadrature phase shift keying (QPSK), 16-quadrature amplitude modulation (16 QAM), and 64-quadrature amplitude modulation (64-QAM) methods. A 16-QAM or more modulation method can be employed for higher data rate. Further, a modulation method having a higher order than the 64-QAM method can be employed. An encoding and decoding method can employ a convolution code method, a turbo code method, a quasi-complementary turbo code (QCTC) method, or a low density parity check (LDPC) encoding method. For the higher data rate, it will be most effective to employ the LDPC method, the turbo code method, or the quasi-complementary code method.

The optical transceiving units 522-1 ... 522-n refer to devices for performing an optical communication with the radio access unit 304. The optical transceiving units 522-1 ... 522-n receive electric signals from the modems 521-1, ..., 521-n, convert the received signals into optical signals, and transmit the converted signals. The optical transceiving units 522-1, ..., 522-n receive optical signals from the radio access unit 304, convert the received optical signals into electric signals, and output the converted signals to the modems 521-1, ..., 521-n. The radio access unit 304 will be described with reference to FIG. 6.

As shown in FIG. 5, the distributed network controller 305 includes the data path switch 501 for enabling data swap between the micro cells 320. The data path switch 501 can be constituted as a logical switch.

The present invention proposes that the switch between the micro cells 320 to adapt the downlink data transmitted from the distributed network controller 305 and transmit the adapted data to a relevant picocell. Such a switching system refers to an input/output system corresponding to one picocell (or radio access unit 304). The switching system has a structure in which data to be inputted to, and outputted from, each picocell can be handled using data paths of the same number as the number of antennas of a MIMO-blast system to be installed in the radio access unit 304. It can be used for a handoff function between the micro cells 320.

Figure 6:
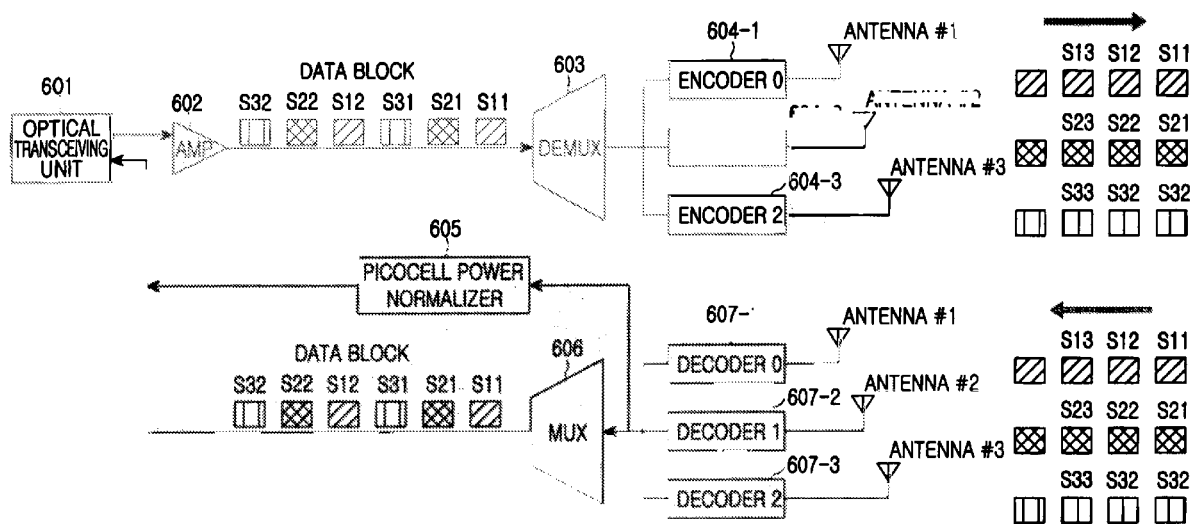
FIG. 6 illustrates a construction of a radio access unit according to an exemplary embodiment of the present invention.

FIG. 6 illustrates a construction of the radio access unit according to an exemplary embodiment of the present invention.

Referring to FIG. 6, an optical transceiving unit 601 has the same construction as the optical transceiving units 522-1 ... 522-n of FIG. 5 and thus, its detailed description will be omitted.

An amplifier 602 amplifies a received signal into a processible-level signal, and outputs the amplified signal to a demultiplexer (DEMUX) 603. The demultiplexer 603 divides data to transmit on a per-antenna basis in order to transmit the data by the MIMO, and outputs the divided data to encoders 604-1 ... 604-3 associated with respective antennas. FIG. 6 exemplifies a case where three multi-antennas are used by the MIMO. However, in actuality, two or more antennas may be used in a typical MIMO configuration. Accordingly, two, three, four or more antennas can be used depending on the MIMO used for the wireless communication system.

The encoders encode each received data suitably according to channel circumstances, and then transmit the encoded data through the antennas. It should be noted that a construction for wireless processing between the encoders 604-1 ... 604-3 and the antennas is known in the art and thus, its discussion is omitted with regard to FIG. 6.

The antennas receive signals from the mobile terminals, respectively, and output the received signals to decoders 607-1 ... 607-3. A construction of wireless processing for converting a wireless signal into a baseband signal is known in the art and thus, is omitted. The respective decoders 607-1 ... 607-3 decode the signals encoded and transmitted by the mobile terminal. The respective decoders 607-1 ... 607-3 output the decoded signals to a multiplexer (MUX) 606 and a picocell power normalizer 605. The signal inputted to the multiplexer 606 is a data signal. The signal inputted to the picocell power normalizer 605 is information on the signal strength, which is received from the base station 103, measured, and fed-back by each mobile terminal. The signal strength measured by the mobile terminal is normalized in the picocell power normalizer 605 and is provided to the base station transceiving subsystem 303 as described in FIG. 5. The signal normalized in the picocell power normalizer 605 is transmitted using a baseband transmission method as described above.

Even in the multiplexer 606, transmission is identically performed using the baseband transmission method. The multiplexer converts the signals received from the respective decoders 607-1 ... 607-3, into one data stream.

The MIMO used in the present invention can employ N (N is a natural number of 2 or more) number of antennas, and can employ a blast method. Accordingly, the distributed network controller 305 can have N number of data paths for one terminal. However, the signal strength from the mobile terminal is normalized for a distance, an optical attenuation, and each characteristic of the optical transceiving unit 601 so that a fast L1 handoff can be implemented between the picocells 314 ... 316. This operation is possible when the mobile terminal initially registers with the wireless communication system, and is linked with a power control operation within the micro cell 320 so that a normalization value can be outputted. This signal is transmitted to the distributed network controller 305 of the base station transceiver subsystem 303 through an optical cable over a channel separate from the data communication.

Figure 7:
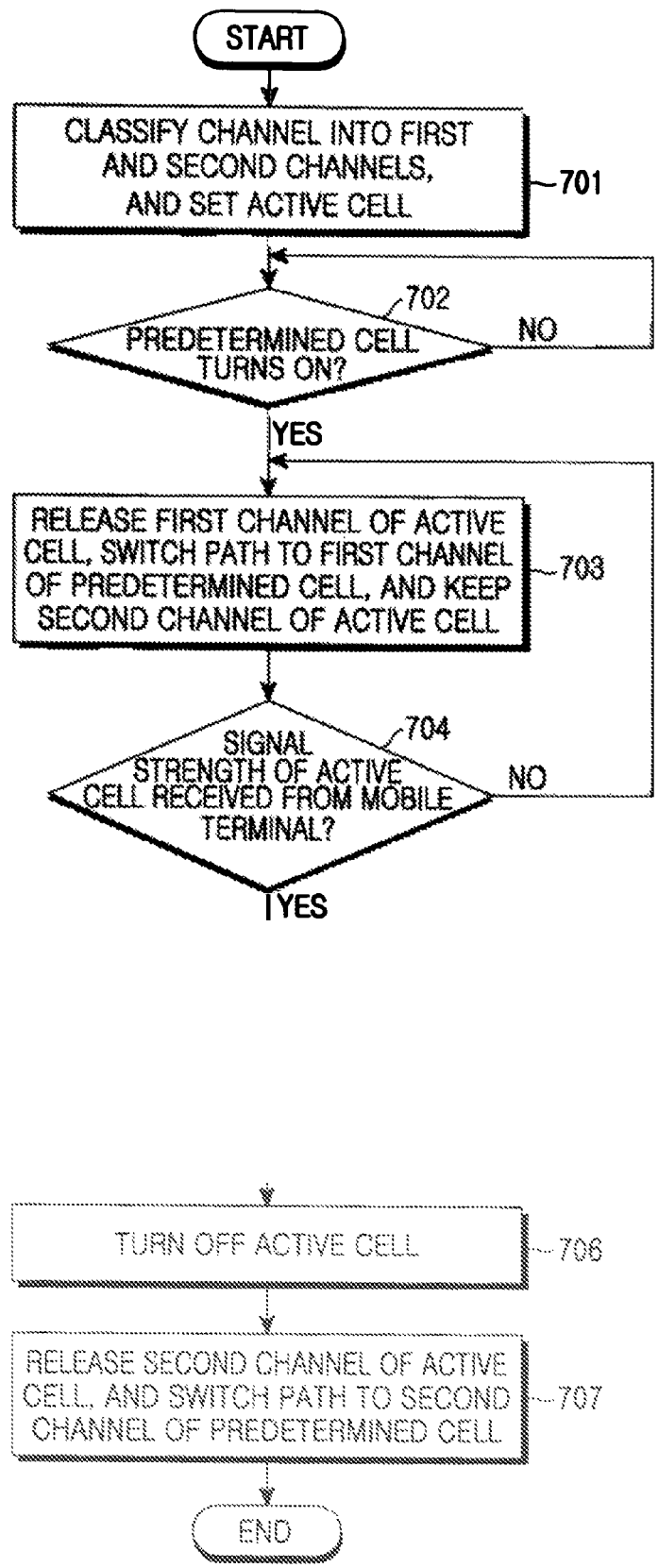
FIG. 7 is a flowchart illustrating a handoff process of an optical distributed network system according to an exemplary embodiment of the present invention.

FIG. 7 is a flowchart illustrating a handoff process of the optical distributed network system according to an exemplary embodiment of the present invention.

Referring to FIG. 7, the distributed network controller 305 classifies a channel for transceiving data with the mobile terminal, into a first channel and a second channel, and sets an active cell (S701). The present invention illustrates the use of two antennas in the MIMO system. The switch of the distributed network controller 305 operates as a two-way switch. Whole data (D) is transmitted from the base station transceiver subsystem 303 to the mobile terminal through data paths of data 1 (D1) and data 2 (D2) by a MIMO-blast.

When the whole data from the base station transceiver subsystem 303 to the mobile terminal is expressed as "D(D1+D2)", the mobile terminal transceives the data in an "A" position over two channels (fn) and (fn+1). The channel is classified as the first channel and the second channel respectively. This classification is to define the rule for the allocation and release operations when data is switched to a multi path in the handoff process and the use of additional channels is considered to be within the scope of the invention.

In an exemplary embodiment of the present invention, the picocells constituting the micro cell are constructed using the same channel, and the micro cells constituting one macro cell are constructed using the channels different from each other, respectively.

As described above, the respective radio access units, which are installed within the picocells, perform the uplink and the downlink communication within the unitary micro cell 320, using the same frequency and the same channel.

Employed is a method in which the data transmitted to the downlink is broadcasted, and the data transmitted to the uplink is uni-casted. When the mobile terminal moves within a unitary micro cell 302, a change between picocells 303 can be generated. The mobile terminal can implement the handoff in such a soft handoff manner that the data swap between the sectors or the picocells 303 is performed by the rake receiver.

As the mobile terminal moves in position, the distributed network controller 305 receives a signal strength of a predetermined cell from the mobile terminal. The distributed network controller 305 measures the received signal strength of the predetermined cell, and determines on/off status of the predetermined cell. Turning on the predetermined cell (S702), the distributed network controller 305 checks a channel of the predetermined cell. When it is determined that the predetermined cell has a greater signal strength than an active cell, the distributed network controller 305 releases the first channel of the active cell and switches the path to a first channel of the predetermined cell, and keeps the second channel of the active cell (S703).

When the distributed network controller 305 turns on the predetermined cell, the handoff between the micro cells is implemented. However, an actual operation is implemented by an operation between the picocells. This operation is implemented by transmitting the signal strength of the predetermined cell from the mobile terminal to the distributed network controller 305 and performing the on/off status determination. When the predetermined cell turns on, switching the data 1 (D1) on a first channel of an adjacent neighbor cell and keeping a channel of the in-transmission data 2 (D2) as it is.

As the mobile terminal moves in position, the distributed network controller 305 receives the signal strength of the active cell from the mobile terminal (S704). The distributed network controller 305 measures the received signal strength of the active cell. When the signal strength of the active cell is a preset critical value or less (S705), the distributed network controller 305 turns off the active cell (S706).

The distributed network controller 305 releases the second channel of the active cell for transmitting the data 2 (D2), and switches the path for transmitting the data 2 (D2), to a second channel of the predetermined cell (S707).

In the handoff method of the optical distributed network system, the handoff process of the mobile terminal implemented in a position where two micro cells overlap and in a position where three micro cells overlap will be described in more detail with reference to FIGS. 9 and 11, respectively.

Figure 8:
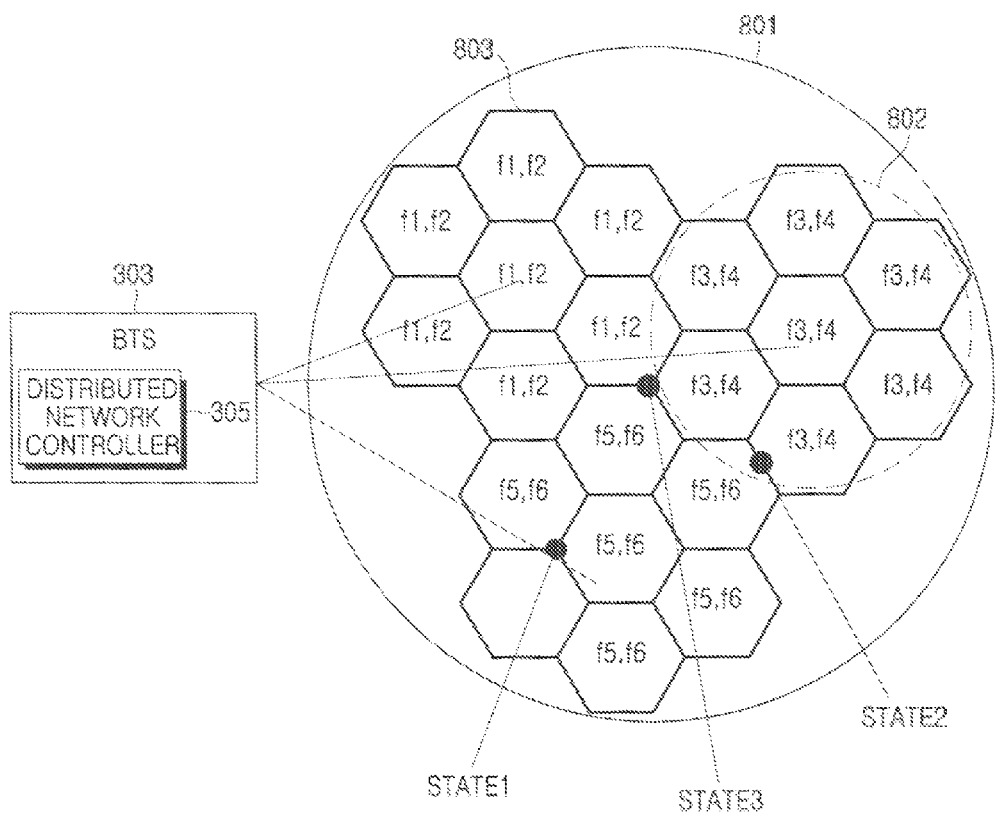
FIG. 8 illustrates an internal construction of a macro cell by a unitary base station transceiver subsystem according to an exemplary embodiment of the present invention.

FIG. 8 illustrates a construction of the macro cell by a unitary base station transceiver subsystem according to an exemplary embodiment of the present invention.

Referring to FIG. 8, the unitary base station transceiver subsystem 303 connects at its lower level with the plurality of radio access units (not shown). The radio access units connecting with the unitary base station transceiver subsystem 303 have predetermined surrounding service boundaries. These service boundaries are referred to as "picocells" in the present invention. A micro cell 302 composed of a plurality of picocells 803. A macro cell 801 is constituted collecting at least two micro cells 802. Thus, the base station transceiver subsystem 303 can manage one macro cell 801 or manage one micro cell 802. Furthermore, the base station transceiver subsystem 303 can manage cells of sizes different from each other such as the micro cell 802 or the macro cell 801 is decided depending on the number of mobile terminals provided in a corresponding service boundary.

As shown in FIG. 8, the micro cell 802 is composed of several picocells 803. The number of the picocells 803 should be cautiously decided considering an existing condition, such as expected traffic circumstances and the number of users at a place where a system is to be installed. This is a fact obvious to those having an ordinary knowledge in the art. The MIMO, which is a key technology of a B3G or $4^{th}$ generation mobile communication system, is embodied on a per-picocell basis. The mobile terminal can communicate with the radio access unit of a service boundary where it is positioned, using the MIMO.

As described above, connections between the base station transceiver subsystem 303 and the radio access units constituting each picocell 803 employ an optical communication method. The present invention proposes that a communication between the base station transceiver subsystem 303 and the radio access unit 304 be based on a baseband optical communication.

The base station transceiver subsystem 303 is positioned in the middle of the micro cell 320 to minimize a distance from each radio access unit. The present invention provides the distributed network controller 305 within the base station transceiver subsystem 303 to manage the plurality of radio access units.

As shown in FIG. 8, the unitary macro cell 801 consists of three micro cells 802. Each micro cell 802 consists of seven picocells 803. However, it is obvious that the numbers of the micro cells 802 and the picocells 803 constituting the macro cell 801 can be different depending on a state of the communication system.

The picocells 803 constituting the micro cell 802 are constructed using the same channel and the micro cells 802 constituting one macro cell 801 are constructed using the channels different from each other, respectively.

Thus, the picocells within each micro cell 802 are constructed using a set of the same channel ((f1, f2), (f3, f4), (f5, f6)), respectively, and the inter micro cells 802 are constructed using the channels different from each other, respectively.

As described above, each of the radio access units installed within the picocells provided within the micro cell 802 performs a communication using an uplink and a downlink communication within the unitary micro cell 802, using the same frequency and the same channel.

Employed is a method in which downlink transmitted data is broadcasted and data transmitted to the uplink is uni-casted. In other words, the data transmitted to the downlink employs a method in which, by broadcasting data of each mobile terminal, all terminals can receive and hold only their own data. On the other hand, the uplink transmitted data employs a uni-casting method so that a specific mobile terminal can distinguish a transmission signal. This is to prevent a consumption of a frequency channel more than is needed. Distinguishing the uplink data on a per-user basis can secure a user channel by a multiplexing method such as orthogonal frequency division multiplexing (OFDM).

When the mobile terminal moves within the unitary micro cell 802, the mobile terminal can implement the handoff between the picocells in such a soft handoff manner that the data swap between the sectors or the picocells is performed by the rake receiver.

If the mobile terminal is positioned in STATE1, only the data swap by the rake receiver is performed. This operation is normalized in the radio access unit, and is realized by the signal strength received by the distributed network controller 305 from the mobile terminal. If the mobile terminal is positioned in STATE2 or STATE3, the handoff between the picocells with different channels set is implemented.

Figure 9:
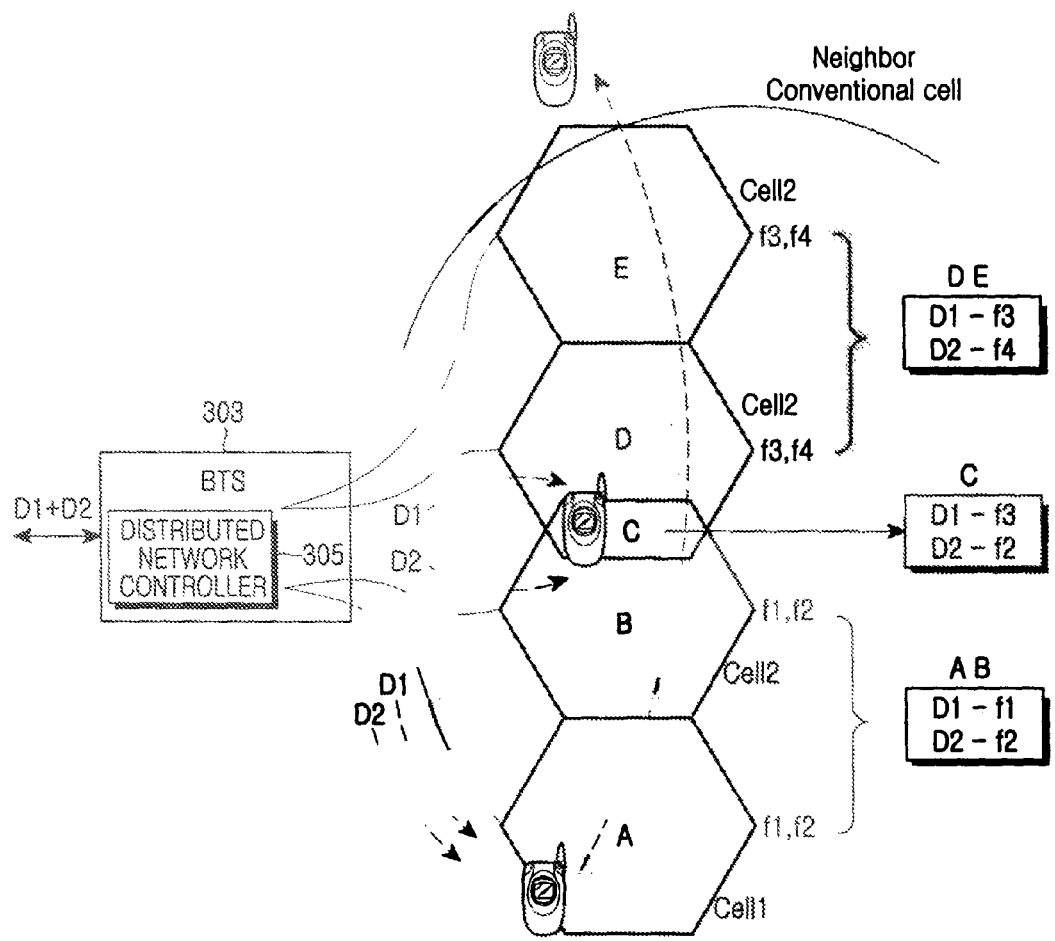
FIG. 9 illustrates an example of a handoff process at a place where two micro cells are overlapped according to an exemplary embodiment of the present invention.

FIG. 9 illustrates an example of a handoff process at a place where two micro cells overlap according to an exemplary embodiment of the present invention.

FIG. 9 exemplifies that two antennas are used in the MIMO. Accordingly, the switch of the distributed network controller 305 operates as a two-way switch. The whole data (D) is transmitted from the base station transceiver subsystem 303 to the mobile terminal through the paths of the data 1 (D1) and the data 2 (D2) by the MIMO-blast.

If the whole data transmitted from the base station transceiver subsystem 303 to the mobile terminal is expressed as "D(D1+D2)", the mobile terminal transceives the data in an "A" position over two channels (fn) and (fn+1), respectively. The channel is classified as the first channel and the second channel, respectively. In the "A" position, the first channel of the D1 is denoted by "f1", and the second channel of the D2 is denoted by "f2".

This classification is to define a rule for allocation and release operations when data is switched to a multi path in the handoff process. As described in FIG. 8, when the mobile terminal moves from the "A" position to a "B" position, a change between the picocells is generated within the same micro cell 802. Thus, in the mobile terminal, only the data swap between the sectors or the picocells is performed by the rake receiver.

This process is performed under the control of the radio access unit (not shown). The "B" position is in the same state as the "A" position. The mobile terminal transceives the data over the channels (f1) and (f2), using the same method as in the "A" position.

If the mobile terminal moves from the "B" position to a "C" position, the handoff between the micro cells 802 is implemented. However, the actual operation is implemented by the operation between the picocells. This operation is implemented by transmitting a signal strength of a cell 2 from the mobile terminal to the distributed network controller 305 and performing the on/off state determination, and, at a time point when the cell 2 turns on, switching the data 1 (D1) by a first channel (f3) of channels (P3) and (f4) of an adjacent neighbor cell and keeping the in-transmission data 2 (D2) by the second channel (f2) of a cell 1 as it is.

If the mobile terminal moves to a "D" position, the distributed network controller 305 turns off the cell 2, releases the existing second channel (f2) of the data 2 (D2), and switches to a new second channel (f4) of the cell 2.

Moving to an "E" position, the mobile terminal transceives the data over the channels (f3) and (f4) of the data 1 (D1) and the data 2 (D2) switched in the "D" position. In this case, the change between the picocells is generated within the same micro cell 802. Thus, in the mobile terminal, only the data swap between the sectors or the picocells is performed by the rake receiver.

Figure 10:
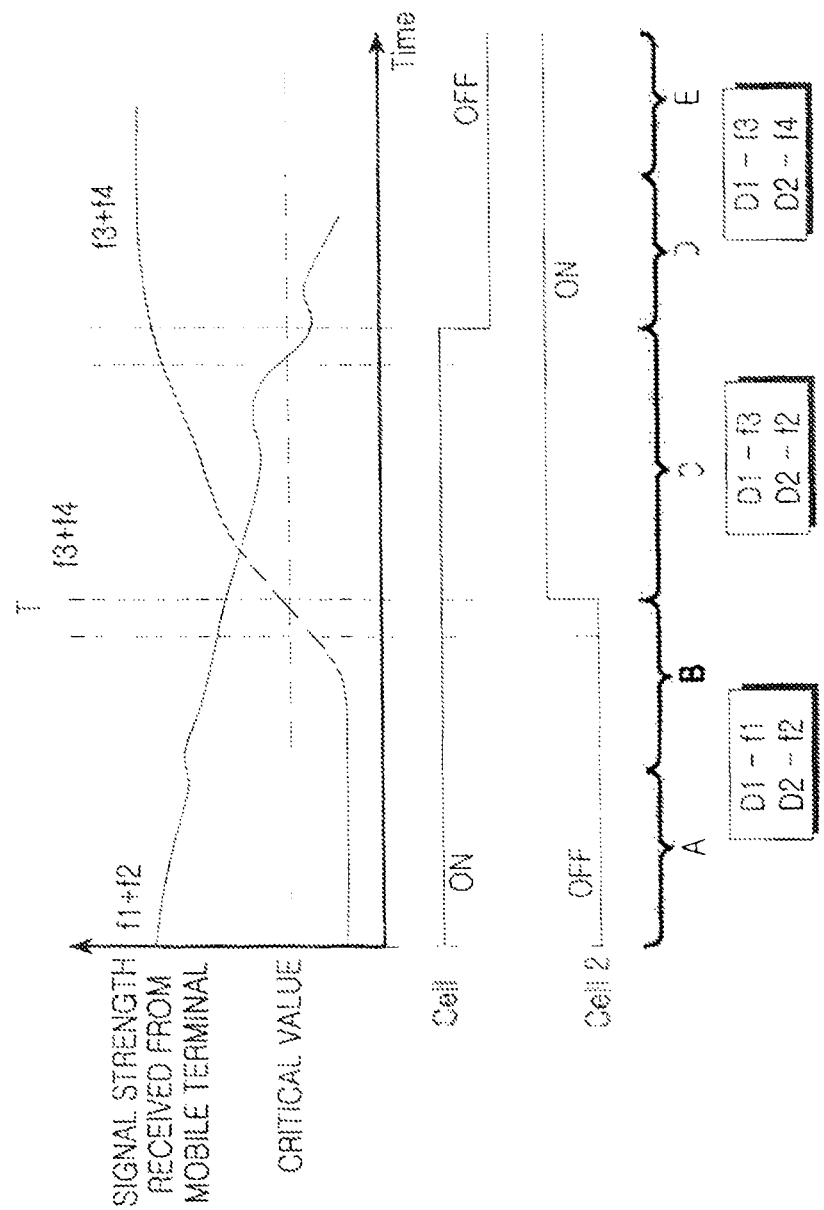
FIG. 10 illustrates an example of an on/off operation of a picocell depending on a position movement of a mobile terminal of FIG. 9.

FIG. 10 illustrates an example of an on/off operation of the picocell depending on a position movement of the mobile terminal of FIG. 9.

Referring to FIG. 10, it is shown that the on/off operation of the picocell is performed depending on the position movement of the mobile terminal. As shown in FIG. 10, the cell 1 turns off when it enters the "C" position where the signal strength received from the mobile terminal is less than a critical value, and the cell 2 turns on from when it enters the "C" position where the signal strength received from the mobile terminal is at least the critical value.

As described in FIG. 9, if the whole data transmitted from the base station transceiver subsystem 303 to the mobile terminal is expressed as "D(D1+D2)", the mobile terminal transceives the data in the "A" position over the two channels (f1) and (f2), respectively.

When the mobile terminal moves from the "A" position to the "B" position, the change between the picocells is generated within the same micro cell 802. Thus, in the mobile terminal, only the data swap between the sectors or the picocells is performed by the rake receiver. The "B" position is in the same state as the "A" position. The mobile terminal transceives the data over the channels (f1) and (f2), using the same method as in the "A" position.

When the mobile terminal moves from the "B" position to the "C" position, the distributed network controller 305 receives the signal strength of the cell 2 from the mobile terminal, and performs the on/off determination. If the cell 2 turns on, the hand off between the micro cells 802 is implemented.

When the cell 2 turns on, the data D1 is switched by the first channel (f3) of the channels (f3) and (f4) of the adjacent neighbor cell, and the data D2 in transmission is kept by the second channel (f2) of the cell 1 as it is.

When the mobile terminal moves to the "D" position, the distributed network controller 305 turns off the cell 2, releases the existing second channel (f2) of the data D2, and switches to the new second channel (f4) of the cell 2.

Moving to the "E" position, the mobile terminal transceives the data over the channels (f3) and (f4) of the data D1 and D2 switched in the "D" position. In this case also, as described above, the change between the picocells is generated within the same micro cell 802. Thus, in the mobile terminal, only the data swap between the sectors or the picocells is performed by the rake receiver.

As the mobile terminal moves in position as above, the handoff is implemented at the place where two micro cells are overlapped.

Figure 11:
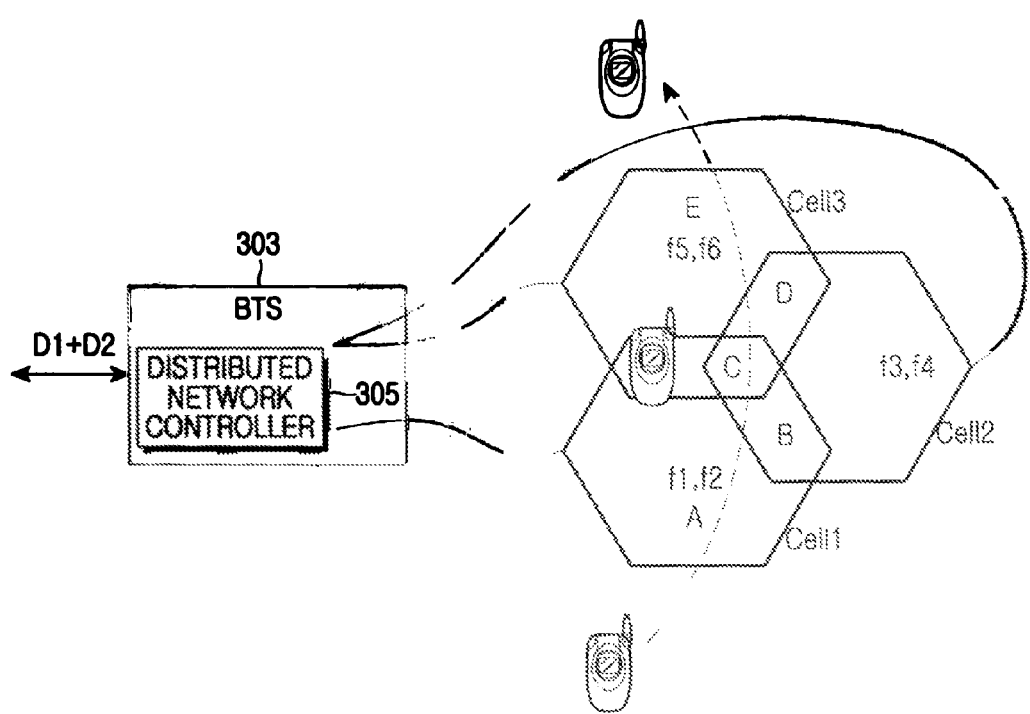
FIG. 11 illustrates an example of a handoff process at a place where three micro cells are overlapped according to an exemplary embodiment of the present invention.

FIG. 11 illustrates an example of a handoff process at a place where three micro cells are overlap according to an exemplary embodiment of the present invention.

In the handoff process at the place where three micro cells overlap, it is exemplified that two antennas are used in the MIMO system in the same manner as that of FIG. 9. If whole data transmitted from the base station transceiver subsystem 303 to the mobile terminal is expressed as "D(D1+D2)", the mobile terminal transceives data in an "A" position over two channels (fn) and (fn+1), respectively. The channel is classified into a first channel and a second channel, respectively. A first channel and a second channel of a cell 1 are denoted by "f1" and "f2", a first channel and a second channel of a cell 2 are denoted by "f3" and "f4", and a first channel and a second channel of a cell 3 are denoted by "f5" and "f6".

The handoff process implemented as the mobile terminal moves from the "A" position to a "B" position is the same as the handoff process of FIG. 9 at the place where two micro cells overlap and thus, its description will be omitted.

If the mobile terminal moves from the "B" position to a "C" position, the distributed network controller 305 receives a signal strength of the cell 3 from the mobile terminal, and turns on the cell 3. If so, in the "C" position, the D1 transmitted over the first channel (f3) of the cell 2 can be kept by the first channel (f3) or can be set to the first channel (f5) of the cell 3. However, the signal strength received by the distributed network controller 305 from the mobile terminal can be switched to a channel of the channels (f3) and (f5) in the "C" position having better characteristics.

As the cell 1, the cell 2, and the cell 3 overlap in the "C" position, the signal strength from the mobile terminal can be differentiated, and a movement direction of the mobile terminal among the neighbor picocells can be predicted. The movement direction of the mobile terminal can be obtained by calculating a movement direction of a cell where the mobile terminal moves, using the base station transceiver subsystem 305.

In an exemplary embodiment of the present invention, the signal strength received by the distributed network controller 305 from the mobile terminal in the "C" position is best in the cell 3. Accordingly, the first channel (f3) of the cell 2 is released, and the first channel (f5) of the cell 3 is switched. At that time point, the existing second channel (f2) of the cell 1 for transmitting the data 2 (D2) is released, and, as the first channel (f5) of the cell 3 is selected, the second channel (f4) of its opposite cell 2 is switched. This is to keep a dual path for data transmission from two cells, in a handoff region.

By the above operation, a signal strength profile in each cell can be naturally sequenced along the movement direction of the mobile terminal.

In a "D" position, the mobile terminal keeps the final first channel and second channel depending on the movement direction in the "C" position. Last, in an "E" position, as the cell 2 turns off under the control of the distributed network controller 305, the mobile terminal switches to the second channel (f6) of the cell 3.

Figure 12:
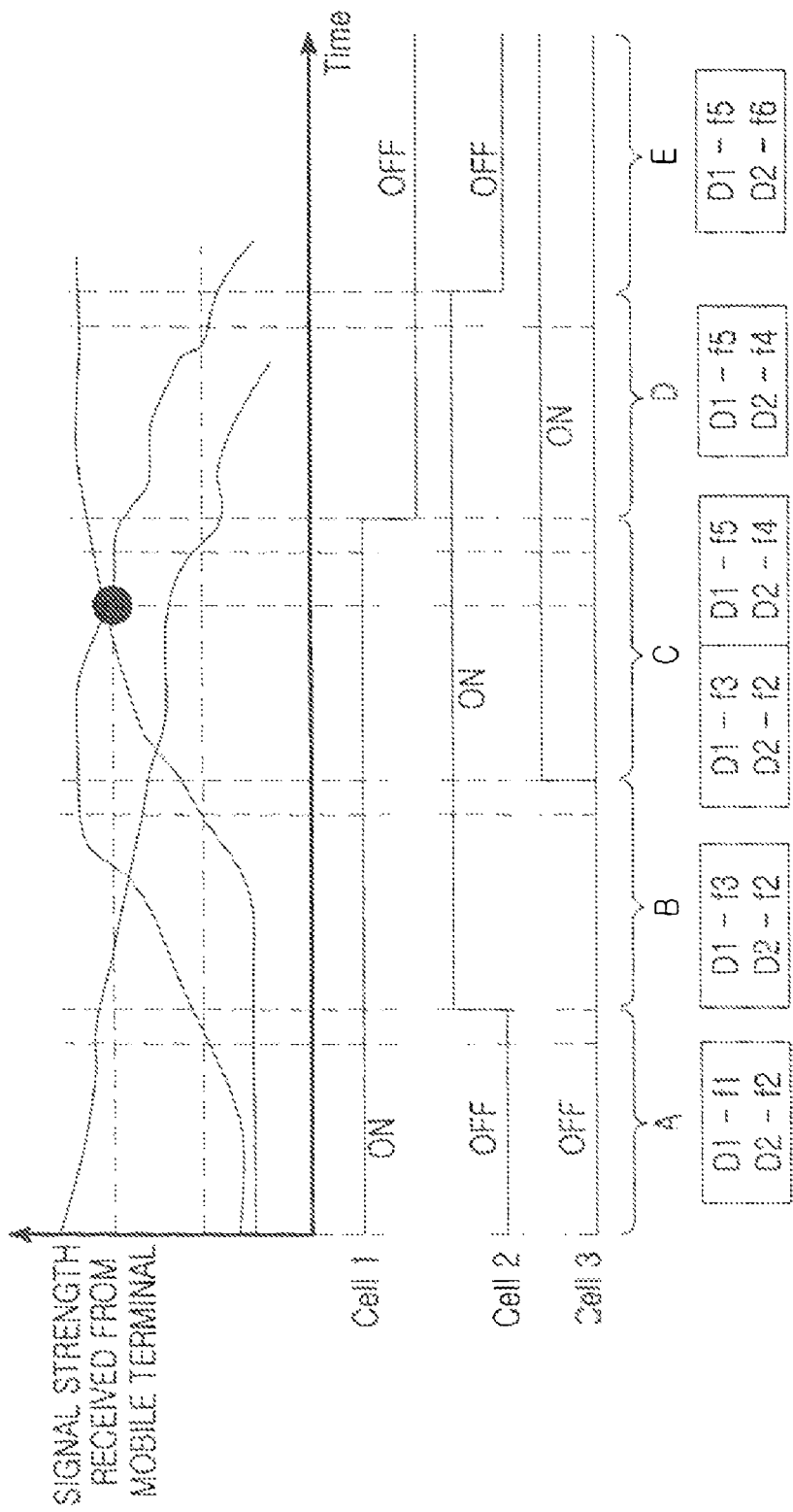
FIG. 12 illustrates an example of an on/off operation of a picocell depending on a position movement of a mobile terminal of FIG. 11.

FIG. 12 illustrates an example of an on/off operation of the picocell depending on the position movement of the mobile terminal of FIG. 11.

FIG. 12 shows the on/off operation of the picocell depending on the position movement of the mobile terminal. The cell 1 turns off when it enters the "D" position where the signal strength received from the mobile terminal is less than a critical value. The picocell 2 turns on starting from the "B" position where the signal strength received from the mobile terminal is at least the critical value. The picocell 3 turns on starting from the "C" position where the signal strength received from the mobile terminal is at least the critical value.

When the mobile terminal moves from the "A" position to the "B" position, the distributed network controller 305 receives the signal strength of the cell 2, and turns on the cell 2. If so, the handoff between the micro cells 802 is implemented. When the cell 2 turns on, the data D1 is switched to the first channel (f3) of the channels (f3) and (f4) of an adjacent neighbor cell, and the data D2 in transmission is kept by the second channel (t2) of the cell 1 as it is.

When the mobile terminal moves from the "B" position to the "C" position, the distributed network controller 305 receives the signal strength of the cell 3, and turns on the cell 3. If so, the distributed network controller 305 releases the first channel (f3) of the cell 2 in the course of transmitting the data D1, and switches to the first channel (f5) of the cell 3 where the signal strength from the mobile terminal is best. The existing second channel (f2) of the cell 1 in the course of transmitting the data D2 is released, and as the first channel (f5) of the cell 3 is selected, the second channel (f4) of its opposite cell 2 is switched.

In the "D" position, the mobile terminal keeps the final first channel and second channel depending on the movement direction in the "C" position. Lastly, in the "E" position, as the cell 2 turns off under the control of the distributed network controller 305, the second channel (f6) of the cell 3 is switched.

As the mobile terminal moves in position as above, the handoff is implemented at the place where three micro cells are overlapped.

As described above, in the present invention, the handoff frequently implemented between the picocells is controlled in the optical distributed network system using the multi input multi output for the B3G or fourth generation mobile communication system, thereby minimizing a latency time and enabling uniform data transmission.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to a preferred embodiment thereof, it will be understood by those skilled in the art that various changes in form and details may be made without departing from the spirit and scope of the invention as defined by the appended claims.

What is claimed is:

1. A method for controlling a handoff in an optical distributed network system using MIMO (multi input multi output), the method comprising steps of:
    classifying, for each cell, a channel for transceiving data with a mobile terminal, into a first channel and a second channel, and setting an active cell;
    receiving a signal strength of a predetermined cell from the mobile terminal, measuring the received signal strength of the predetermined cell, and determining on/off status of the predetermined cell;
    when the predetermined cell is determined to be turned on, releasing the first channel of the active cell, switching a path to a first channel of the predetermined cell, and keeping the second channel of the active cell;
    receiving a signal strength of the active cell from the mobile terminal, measuring the received signal strength of the active cell, and when the measured signal strength of the active cell is less than a preset critical value for a predetermined period of time, turning off the active cell; and
    when the active cell turns off, releasing the second channel of the active cell, and switching the path to a second channel of the predetermined cell.

2. The method of claim 1, wherein the handoff is performed using a MIMO-blast function.

3. The method of claim 2, wherein the MIMO-blast function can allow whole data to have N number of data paths depending on a number of antennas based on the MIMO and its corresponding circuit construction.

4. The method of claim 1, wherein the first channel and the second channel are switched not to allow concurrent transmission in the same cell.

5. The method of claim 1, wherein, when the channel is an N number, a handoff sequence is decided for the N number of the channels.

6. The method of claim 5, wherein the handoff sequence for the N number of the channels is decided by a difference between the signal strengths received from the mobile terminal and prediction of a movement direction of the mobile terminal among neighbor picocells.

7. The method of claim 1, wherein, when the mobile terminal is out of an overlap position of three cells and positioned in an overlap position of two cells, a second channel of another cell corresponding to a sub cell of a first channel is allocated, and data is always transmitted over two paths in a handoff region.

8. A system for communicating between a base station transceiver subsystem and radio access units in a wireless communication system in which a plurality of the radio access units connects to one base station transceiver subsystem, and the radio access units and the base station transceiver subsystem constitute one picocell, respectively, the system comprising:
    a data path switch for switching a signal received from a base station controller, to a predetermined picocell;
    a micro cell HD (header) controller and a picocell HD (header) controller for detecting header information of the signal received from the base station controller, and controlling the data path switch to switch to a predetermined micro cell to receive the signal, and the predetermined picocell provided within the predetermined micro cell, using the detected header information;
    a picocell power meter for receiving a signal strength from the mobile terminal provided within a service boundary of the predetermined picocell, and performing a power control;
    a modem for modulating, encoding, and transmitting the signal inputted from the data path switch, to an optical transceiver, and modulating, encoding, and transmitting a signal inputted from the optical transceiver, to the data path switch; and
    an optical transceiving unit for receiving an electric signal from the modem, converting the received electric signal into an optical signal, and transmitting the converted optical signal to the radio access unit, and receiving an optical signal from the radio access unit, converting the received optical signal into an electric signal, and outputting the converted electric signal to the modem, wherein said system causes a switch from at least one of a plurality of channels of an active cell to at least one of a plurality of channels of said predetermined picocell within the predetermined micro cell when a power from the predetermined picocell exceeds a power from said active cell and a switch of the remaining plurality of channels of the active channel to corresponding channels of the predetermined picocell when said active cell power has fallen below a predetermined threshold for a predetermined period of time.

9. The system of claim 8, wherein the radio access unit comprises:
    an optical transceiving unit for transmitting an optical signal received from the base station transceiver subsystem, to an amplifier;
    the amplifier for receiving the optical signal from the optical transceiving unit, amplifying the received optical signal, and transmitting the amplified signal to a demultiplexer;
    the demultiplexer for receiving the amplified signal from the amplifier, and outputting the received signal to encoders associated with antennas, respectively, by multi input multi output;

the encoder for wirelessly processing the signal received from the demultiplexer, and outputting the signal to the mobile terminal using the antenna;

the decoder for receiving the signal encoded and transmitted by the mobile terminal, decoding the received signal, and outputting the decoded signal to a multiplexer and a picocell power normalizer;

the picocell power normalizer receiving from the decoder information regarding a power level, which is measured and fed-back by the mobile terminal, of a signal received from a base station, and normalizing the received information; and the multiplexer for converting the signal received from the decoder, into one data stream, and transmitting the data stream to the optical transceiver.

10. The system of claim 8, wherein the radio access unit performs an uplink and a downlink communication within the unitary micro cell, using the same frequency and the same channel, wherein downlink transmitted data is broadcasted, and uplink transmitted data employs a uni-casting method based on OFDM (orthogonal frequency division multiplexing) multiplexing method.

11. The system of claim 10, wherein, when the picocell is changed within the unitary micro cell, the mobile terminal performs a handoff between the picocells in such a soft handoff manner that data swap between sectors or the picocells is performed by a rake receiver.

12. The system of claim 8, wherein the radio access unit communicates with the base station transceiver subsystem by a baseband optical communication.

13. The system of claim 8, wherein the signal strength of the mobile terminal in the picocell is normalized in the radio access unit, and is concurrently transmitted as an analog signal to the distributed network controller over a separate optical channel.

14. The system of claim 13, wherein data is switched between the micro cells so that it is adapted to a distributed network in order to transmit downlink data transmitted from the distributed network controller, to a relevant picocell.

* * * * *